United States Patent
De Belie et al.

(10) Patent No.: US 8,400,088 B2
(45) Date of Patent: Mar. 19, 2013

(54) SENSORLESS CONTROL OF SALIENT-POLE MACHINES

(75) Inventors: Frederik De Belie, Ghent (BE); Jan Melkebeek, Wetteren (BE)

(73) Assignee: Universiteit Gent, Gent (BE)

( * ) Notice: Subject to any disclaimer, the term of this patent is extended or adjusted under 35 U.S.C. 154(b) by 292 days.

(21) Appl. No.: 12/918,571

(22) PCT Filed: Feb. 13, 2009

(86) PCT No.: PCT/EP2009/051680
§ 371 (c)(1),
(2), (4) Date: Aug. 20, 2010

(87) PCT Pub. No.: WO2009/103662
PCT Pub. Date: Aug. 27, 2009

(65) Prior Publication Data
US 2010/0327789 A1    Dec. 30, 2010

(30) Foreign Application Priority Data
Feb. 22, 2008 (GB) .................................. 0803279.9

(51) Int. Cl.
*H02P 6/18* (2006.01)
(52) U.S. Cl. .................. 318/400.33; 318/432; 318/727; 318/400.02
(58) Field of Classification Search ............. 318/400.02, 318/400.33, 432, 727, 801, 807
See application file for complete search history.

(56) References Cited

U.S. PATENT DOCUMENTS

| | | | | |
|---|---|---|---|---|
| 5,565,752 | A | * | 10/1996 | Jansen et al. .................. 318/807 |
| 5,796,235 | A | * | 8/1998 | Schrodl et al. ................ 318/801 |
| 6,051,946 | A | * | 4/2000 | Yamada et al. ............... 318/432 |
| 6,064,163 | A | * | 5/2000 | Yoshida et al. .......... 318/400.34 |
| 8,228,013 | B2 | * | 7/2012 | Liu et al. .................. 318/400.33 |
| 2001/0002784 | A1 | * | 6/2001 | Masaki et al. ................ 318/727 |
| 2004/0189240 | A1 | * | 9/2004 | Islam et al. .................... 318/701 |
| 2007/0252587 | A1 | * | 11/2007 | Stauder et al. ............ 324/207.15 |
| 2011/0012544 | A1 | * | 1/2011 | Schulz et al. ............ 318/400.02 |
| 2012/0123715 | A1 | * | 5/2012 | Eskola et al. ................... 702/65 |

FOREIGN PATENT DOCUMENTS

| | | |
|---|---|---|
| DE | 10226974 A1 | 1/2004 |
| EP | 0944164 A1 | 9/1999 |
| GB | 2331191 A | 5/1999 |
| JP | 09233900 A | 9/1997 |

OTHER PUBLICATIONS

Frederik M.I.I.. De Belie et al., "A General Description of High-Frequency Position Estimators for Interior Permanent-Magnet Synchronous Motors", Presented: International Electric Machines & Drive Conf., 2005, Paper 390.

International Search Report in PCT/EP2009/051680, May 20, 2009.

* cited by examiner

*Primary Examiner* — Paul Ip
(74) *Attorney, Agent, or Firm* — Bacon & Thomas, PLLC

(57) ABSTRACT

A controller (100) for controlling a salient-pole machine (200) is disclosed. The controller (100) is adapted to determine at least one operational parameter of the salient-pole machine (200), such as for example a rotor position, a rotor angle or a steady-state voltage. The controller (100) comprises a calculating unit for calculating test pulse properties for test pulses for supply to phase inputs of the salient-pole machine. The test pulse properties thereby comprise a pulse width and the calculating unit (110) is adapted for determining the pulse width in an adaptive manner.

19 Claims, 9 Drawing Sheets

SENSORLESS CONTROL OF SALIENT-POLE MACHINES

TECHNICAL FIELD OF THE INVENTION

The present invention relates to the field of machinery such as for example motors. More particularly, the present invention relates to the field of control and driving of machinery, such as for example salient-pole machines. The method and systems are applicable in a large number of fields, e.g. in advanced energy generation.

BACKGROUND OF THE INVENTION

In order to control the motion states of a synchronous machine in a stable manner it is required to measure the rotor position. This can be achieved by mounting mechanical devices such as encoders or resolvers on the shaft of the machine or by placing hall-sensors or search coils within the machine. Due to important temperature variations within the machine, as well as mechanical vibrations, these sensors can fail, consequently reducing the reliability of the controlled machine. For this reason, as well as to reduce cost and extra cabling, the motion states are estimated instead of measured. This is frequently done by an estimation of the speed dependent induced voltage. However, the signal-to-noise ratio of this voltage is too poor at low speeds to estimate the motion states. Moreover, at standstill, the rotor position can't be estimated from the induced voltage.

At low speeds and at standstill, it is known to inject high-frequency signals in addition to the waveforms required for normal operation of the machine. As the machine has a reluctance variation along the air gap due to the construction of the rotor or due to saturation of the magnetic path, the high-frequency response will depend on the rotor position. By processing this response, an accurate estimation of the rotor position can be made. A parameterless sensorless strategy for the low speed region is disclosed in U.S. Pat. No. 5,565,752. As high-frequency sinusoidal test signals are applied to the machine, band pass filters and a quadrature demodulation or heterodyne detection process are used to obtain an estimation of the rotor position. These filters can generate an important phase delay in the control loop, reducing the dynamic behavior of the drive.

Another parameter-less sensor-less method which reduces the number of filters is disclosed in U.S. Pat. No. 5,796,235, where high-frequency voltage test pulses have been supplied to the machine. Also a further enhancement thereof is known to minimize the current disturbances generated by the test pulses. Additional test pulses with a minimum time span have been computed in order to reduce the disturbance in the steady-state current. The reason for the current disturbances is the variation of the steady-state voltage vector during the test-sequence. Despite the advantage of reducing current disturbances, a machine model has to be identified in order to compute the additional test sequence which lowers the current disturbance.

A parameter-less sensor-less method which injects pulses into the machine terminals without altering the steady-state voltage is disclosed in US2001/002784A1. Nevertheless, in this method the estimated rotor position isn't obtained in one sampling period but converges in several periods to the real one through iteration.

Again another parameterless sensorless method is disclosed in U.S. Pat. No. 6,051,946 which relies on varying, during a test sequence, the voltage by applying high-frequency pulses and maintaining the steady-state. Moreover the estimation error due to saturation is reduced by using a look-up table. Nevertheless, in this method identification procedures are required to obtain the look-up table.

A method for determining rotor position involving provision of test space vectors is also described in DE10226974, the method comprising deriving an estimated rotor position and an error angle for correcting the estimated rotor position.

There is still a need for good methods and systems for controlling salient-pole machines.

SUMMARY OF THE INVENTION

It is an object of the present invention to provide good systems and methods for controlling a salient-pole machine. It is an advantage of embodiments according to the present invention that these may avoid the use of a mechanical transducer, hence increasing reliability and reducing costs. It is an advantage of embodiments according to embodiments of the present invention to provide a controller which does not require an estimation of the induced voltage, a machine model or additional test pulses which would prolong the test sequence. It is an advantage of embodiments according to the present invention that systems and methods are provided with which steady-state current distortion with consequent torque disturbance and audible noise can be reduced, e.g. strongly reduced or even avoided.

The above objective is accomplished by a method and device according to the present invention.

The present invention relates to a controller for controlling a salient-pole machine, the controller comprising a calculating unit for calculating test pulse properties for test pulses for supply to phase inputs of the salient-pole machine, the test pulse properties comprising a pulse width, wherein the calculating unit is adapted for determining the pulse width in an adaptive manner. It is an advantage of embodiments according to the present invention that systems and methods may be provided allowing a better control of salient-pole machines. It is an advantage of embodiments according to the present invention that systems and methods may be provided allowing a more stable control of salient-pole machines.

The controller may be adapted to determine a steady state voltage $V_0$ of phases of the salient-pole machine, and the controller may be adapted to determining the pulse width adaptively as function of the steady state voltage.

For calculating test pulses properties, power supply limitations may be taken into account.

The controller may be adapted to determine a steady state voltage $V_0$ of phases of the salient-pole machine and the calculating unit may be adapted for calculating test voltage vectors $V_1$, $V_2$ for consecutive test pulses, each test voltage vector deviating from the steady state voltage by a respective voltage deviation $\Delta V_1$, $\Delta V_2$, wherein the test voltage vectors $V_1$, $V_2$ may be determined in such a manner that $\Delta V_1$ is at least substantially equal to $-\Delta V_2$. The salient-pole machine may be a salient-pole machine with permanent-magnet excitation.

Determination of the pulse width of said test pulses may be based on the basis of said calculated test voltage vectors $V_1$, $V_2$.

The controller furthermore may be adapted for generating a control signal comprising information regarding the test pulses for supply to a pulse generating unit, also referred to as pulse generator, that is connected with an output to phase inputs of the machine for supplying test pulses to phases of the machine.

A zero-sequence component may be added to the calculated control signal. Two components of the voltage vector may be transformed to three phase voltage, so that one degree of freedom may exist in the solution. The zero-sequence voltage component or the average component of the three phase voltage may be freely chosen as it is a component that does not result in a torque generation.

The controller furthermore may comprise a current response receiving means for receiving a current response in reply to test pulses having the test pulse properties supplied to phases of the salient-pole machine.

The controller may comprise a processing means for processing a current response in reply to the test pulses having the test pulse properties and deriving a operational parameter of the salient-pole machine. The controller may be adapted to control a driving parameter of the salient-pole machine as function of the derived operational parameter. Such a driving parameter may for example be a torque or a speed.

The operational parameter of the salient-pole machine may be a motion state such as for example any of a rotor position, a rotor angle, rotor speed, flux position or speed of the flux vector of the salient-pole machine.

The motion state of the salient-pole machine may be expressed in absolute terms with reference to a reference system fixed to the phases of the salient-pole machine.

The controller may be adapted for deriving an operational parameter based on a difference between two current responses of phases of the salient-pole machine during at least two consecutive test signals, e.g. having a phase displacement with respect to each other. The controller may be adapted for deriving an operational parameter based on a difference between two current responses of phases of the salient-pole machine as a result of at least two consecutive test signals having a phase displacement with respect to each other.

The controller may be adapted, e.g. with switches, for switching the phases between a higher and a lower voltage level, wherein the current responses are received at the controller current input after operation of the switches.

The controller furthermore may be adapted for adjusting the control of the salient-pole machine based on the determined operational parameter.

The steady state voltage vector $V_0$ in a test phase may be transformed in a stationary reference frame $(\alpha\beta)$ and for a first set of sectors (I, III, IV, VI) in the frame $(\alpha\beta)$ a test voltage vector $v^{u+}_{test}$ may be situated on a transverse hexagonal boundary, and for a second set of sectors (II,V) a voltage deviation $\Delta v^{u}_{test}$ may have an amplitude that is determined by a distance of the voltage vector $V_0$ from an upper or lower horizontal hexagonal boundary.

The controller may be adapted for generating a control signal to a pulse generating unit comprising a pulse width modulator for controlling generating of test pulses having a modulated pulse width.

The controller may be adapted for compensating non-linearity effects in the position of the rotor using a function that is dependent on a saliency ratio of the machine and a current through the magnet. The controller may be adapted for compensating non-linearity effects in the position estimation of a rotor by using a function that is dependent on a saliency ratio and steady-state current components of the machine.

The controller may be adapted for controlling a permanent-magnet synchronous machine.

The controller may be adapted for during operation of the salient-pole machine performing both the function of estimating a motion state and controlling the salient-pole machine at the same time. The controller may be adapted for performing simultaneously the function of estimator and controller.

The present invention also relates to an assembly of a permanent magnet synchronous machine, a pulse generating unit connected with its output to phase inputs of the machine and a controller as described above connected to the pulse generating unit.

The present invention furthermore relates to a method for controlling a salient-pole machine, the method comprising calculating test pulse properties for test pulses for supply to phase inputs of the salient-pole machine, the test pulse properties comprising a pulse width, wherein calculating test pulse properties comprises determining the pulse width in an adaptive manner.

The method may comprise determining the pulse width adaptively as function of a steady state voltage $V_0$ of phases of the salient-pole machine.

The method may comprise calculating test pulse properties taking into account power supply limitations for the machine.

Calculating test pulse properties may comprise calculating test voltage vectors $V_1$, $V_2$ for consecutive test pulses, each test voltage vector deviating from the steady state voltage by a respective voltage deviation $\Delta V_1$, $\Delta V_2$, wherein the test voltage vectors $V_1$, $V_2$ may be determined in such a manner that $\Delta V_1$ is at least substantially equal to $-\Delta V_2$.

The method further may comprise providing test pulses to phases of the machine.

The method may comprise adding a zero-sequence component to a calculated control signal based on the calculated test pulse properties.

The method may comprise receiving a current responses of phases of the salient-pole machine received as response to test pulses having the calculated test pulse properties.

The method may comprise deriving an operational parameter of the salient-pole machine based on the received current response.

The method may comprise adjusting the control of the salient-pole machine based on the determined operational parameter.

The method may comprise compensating non-linearity effects in the position of the rotor using a function that is dependent on a saliency ratio of the machine and a current through the magnet. The method may comprise compensating non-linearity effects in the position estimation of a rotor by using a function that is dependent on a saliency ratio and steady-state current components of the machine.

The present invention also relates to a computer program product for, when executed on a computing device, performing a method of controlling a salient-pole machine as described above.

It furthermore relates to a machine readable data storage device storing such a computer program product or the transmission of such a computer program product over a local or wide area telecommunications network.

The present invention in one aspect relates to a method for controlling a salient-pole machine, the method comprising obtaining current responses in reply to test signals, optionally showing a phase displacement with respect to each other, applied to the salient-pole machine, and deriving an operational parameter of the salient-pole machine based on a difference between said obtained current responses.

The present invention also relates to a controller for controlling a salient-pole machine, the controller comprising a current receiving means for obtaining current responses in reply to test signals, optionally showing a phase displacement with respect to each other, applied to the salient-pole machine, and a calculator for deriving an operational parameter of the salient-pole machine based on a difference between the obtained current responses.

In one aspect the present invention relates to a method for controlling a salient-pole machine, the method comprising obtaining an estimate of an operational parameter of the salient-pole machine, obtaining an estimation error for the operational parameter and compensating the estimate of the operational parameter with the estimation error. The estimation error may be based on a model or a functional dependency. The estimation error may be determined as a function of a direct current and a quadrature current in the salient-pole machine.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

Figure 1:
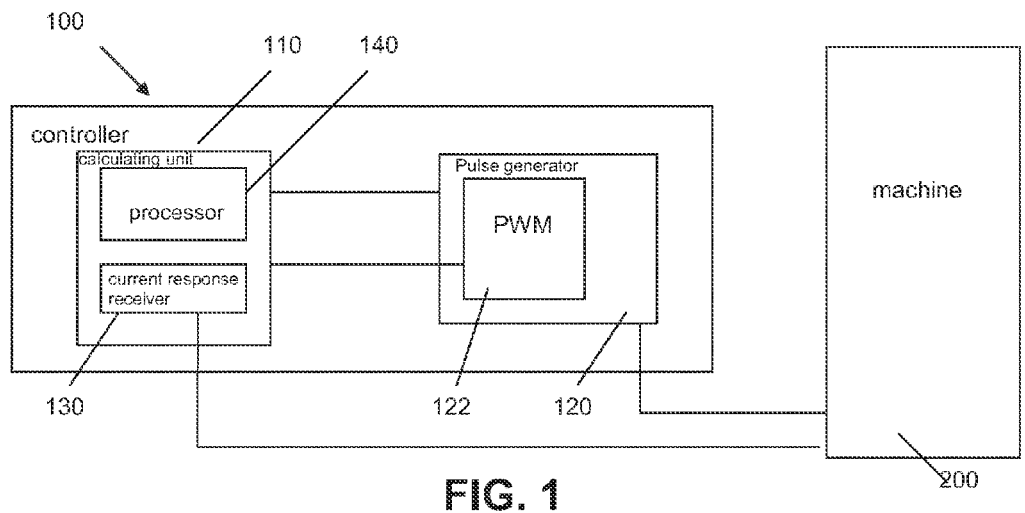
FIG. 1 shows a schematic diagram of a control system for controlling a salient-pole machine according to embodiments of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention. Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention. These definitions should not be construed to have a scope less than understood by a person of ordinary skill in the art. Where in the present reference is made to a salient-pole machine, this term refers to machines having a structure of magnetic material whereon a field coil of a generator, motor or similar device is mounted and which upon operation allows generation of energy. In a salient-poles machines, a stator or rotor of the machine may comprise slots and windings of field coils may be placed within these slots. In salient-pole machines, a reluctance variation along an airgap may exist as a result of construction or due to magnetic properties of the materials used within the machine.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In a first aspect, the present invention relates to a controller for controlling a salient-pole machine. The salient-pole machine may be a salient-pole machine with permanent-magnet excitation, although the invention is not limited thereto. It may be a motor, such as for example a synchronous motor with a field winding. By way of illustration, the present invention not being limited thereto, an example of controller according to an embodiment of the present invention in a configuration with a salient-pole machine is shown in FIG. 1. A controller 100 is shown. Such a controller 100 may be used for advanced energy generation. The controller 100 comprises a calculating unit 110 for calculating test pulse properties for test pulses. These test pulses may be used to obtain information regarding the control of the salient-pole machine, such as for example a rotor position or rotor angle, when the salient-pole machine comprises a rotor and a stator. The rotor angle may be representative for the position of the rotor in the salient-pole machine. The test pulses properties may be supplied to a pulse generator 120 adapted for supplying test pulses having the calculated test pulse properties to the phase inputs of the machine 200. According to the first aspect of the present invention, the test pulse properties comprise a pulse width of the test pulses. The calculation unit 110 thereby is adapted for determining the pulse width in an adaptive manner. The controller 100 may be adapted to determine at least the steady-state voltage $V_0$ of the salient-pole machine. The pulse width may be determined adaptive with respect to a function of the average stator voltage. A plurality of test pulses may be generated. Advantageously at least two consecutive test pulses are generated. More advantageously the test pulses are generated in a test pulse train so that systematic control can be performed. The frequency of the generated test pulse train may be significantly higher than 500 Hz, e.g. within a range of 1 kHz to 20 kHz, advantageously within a range of 5 kHz to 20 kHz, even more advantageously if it is synchronous with the carrier frequency of the pulse generator or sampling frequency of the controller. The test pulses properties may result in a step function for the test pulses, although the invention is not limited thereto. The latter allows a more easy processing of the current responses that will be generated as response to the test pulses. More particularly, by avoiding sinusoidal test pulses, the amount of filtering needed to obtain a usable current response may be reduced or even minimised. The test pulses induced may be used for deriving an estimation of an operational property of the salient-pole machine, such as for example the rotor position and/or the rotor angle. The latter may be based on a received current response to the applied test pulses. By generating test pulses in an adaptive manner, sensorless control of the machine is allowed, resulting in a high liability and low cost.

It is an advantage of embodiments according to the present invention that the test pulses used can be optimised for the application used, thus resulting in a more appropriate control of the system.

In one particular embodiment of the present invention, the controller 100 is adapted to determine a steady-state voltage $V_0$ of phases of the salient-pole machine 200 and to determine the pulse width adaptively as function of the steady state voltage $V_0$. By way of illustration, the present invention not being limited thereto, the test pulse properties may be determined as follows.

Test voltage vectors $V_1$, $V_2$ may be determined, whereby each of the test voltage vectors deviates from the steady-state voltage $V_0$ by a respective test voltage vector deviation $\Delta V_1$, $\Delta V_2$. The test voltage vectors thereby may be determined in such a manner that $\Delta V_1$ is at least substantially equal to $-\Delta V_2$. Such test voltage vectors may be determined for generation of two consecutive test voltage pulses. By the use of the adaptive test voltage pulses according to the invention, a sensorless synchronous machine control strategy is obtained that achieves a strong reduction in undesired distortion of the steady-state current. The computation of the adaptive test voltage pulses may be performed based on a steady-state voltage. The latter may be obtained by a measurement of the steady-state voltage. This voltage signal may for example be available within the controller 100 as the controller output that is attached to the phases of the synchronous machine can be regarded as an estimation of the steady-state voltage. This means that no model or additional pulses need to be used to reduce the steady-state current disturbances. By using the adaptive test pulses having a specific angle and amplitude, according to the invention, the amplitude of the high-frequency current response can be minimised while guaranteeing an accurate position estimation in order to control the synchronous machine. As a result the reduction of torque disturbances and audible noise is achieved. It should be noted that the control unit may remain active in a Proportional Integral (PI) manner during the test sequence, consequently increasing the dynamic behaviour of the control loop. Within the calculator the current components thus may be controlled with a PI-controller. An average of each current over a switching period may be measured. By using a centered pulse-width modulator, the phase currents will cross their average value over a switching period in the middle of each switching period. Therefore, sampling the currents on these instances allows to control the average current. During the test periods, the phase currents at the aforementioned sample instances will in principle differ from their average value. This is a result of a nonzero voltage deviation from steady state at these sample instances which is caused if conventional test pulses are used. In the adaptive method, the test pulse sequence may be modified in order to have a zero voltage deviation from steady state at the aforementioned sample instances. One example of a modification of the test pulse sequence may be as follows. A first test vector which results in a test voltage vector deviation $\Delta V_1$ from steady state is applied during half a switching period $T_1$. Following this first test vector, a test vector with a test voltage vector deviation from steady state $\Delta V_2 = -\Delta V_1$ is applied during a whole switching period $T_2$. Finally, a third test vector may be applied during half a switching period $T_3$ which causes a test voltage vector deviation from steady state $\Delta V_1$. Such an exemplary strategy may result in a reduced average torque distortion as the current ripple during the test period has a zero average value. These measurements may be processed and transformed to a reference frame fixed to the rotor and compared to the desired value. The difference may then be given to the PI current controller which output is given to a pulse-width modulator. The PI controller is tuned to have a sufficient phase-margin. With a conventional method a higher steady-state voltage is to be expected compared at low load currents or at low speed. The latter is a result of the steady-state voltage comprising the induced voltage which is proportional to the speed. As a result the higher the load currents or the higher the speed, the stronger the current distortions if conventional test pulses are supplied. The current controller will react on these distortions. However, stability is not guaranteed due to these strong current distortions. Moreover, with conventional test pulses, these current distortions remain unattended by the controller during the test sequences, increasing the danger of losing stability. With the enhanced test pulses, not only the current distortions can be strongly reduced, but also the current may be controlled during the test sequences. As a result of closed loop control as can be obtained in embodiments according to the present invention, a higher speed range can be obtained with a single estimation method without the need to change between a low and a high speed sensorless strategy.

In another embodiment, the limitation to the output voltage of the pulse generator due to the fixed input voltage of the converter is taken into account by transforming the steady-state voltage vector $V_0$ in a test phase to a stationary reference frame ($\alpha\beta$) and situating for a first set of sectors (I, III, IV, VI) in the frame ($\alpha\oplus$) a test voltage vector $v^{u+}_{test}$ on a transverse hexagonal boundary, and determining for a second set of sectors (II, V) a voltage deviation $\Delta v^u_{test}$ that has an amplitude that is determined by a distance of the voltage vector $V_0$ from an upper or lower horizontal hexagonal boundary.

In embodiments according to the present invention, the controller 100 may comprise an output for providing the calculated test pulse properties to a pulse generator (not shown in FIG. 1). In other embodiments according to the present invention, the controller may comprise the pulse generator 120, this alternative being shown in FIG. 1. The pulse generator may be a power electronics device that is supplied with a dc-bus voltage. In one example, by using power switches, which state is controlled by the controller 100, it connects the phases of the machine to either the plus or minus pole of the dc-bus. As machines may have a strong inductive character it is prohibited to disconnect the phases from the dc-bus immediately as it causes overvoltage of the power switches. Therefore, the converter often may be provided with free-wheel diodes through which the current can decay. The pulse generator 120 thereby may be adapted for supplying test pulses to the phase inputs of the salient-pole machine 200. The pulse generator 120 may be adapted with a pulse-width modulator 122 for modulating the pulse width of the test pulses in agreement with the determined pulse widths of the test pulses. The pulse-width modulator 122 may have an input connected to the calculating unit 110 for receiving a control signal being representative of the test pulse properties determined. The pulse-width modulator 122 (PWM) may be adapted for providing the high output frequency of the test pulses as indicated above. The modulation of the test pulses may, in some embodiments, be determined based on determined test voltage vectors $V_1$, $V_2$. By the use of high frequency pulses (frequency of for instance 10 kHz) instead of high-frequency sinusoidal signals, filtering techniques can be avoided. As the two components of the voltage vector may be transformed to three phase voltage, one degree of freedom may exist in the solution. It is the zero-sequence voltage component or the average component of the three-phase voltages that will be freely chosen as it is a component that does not result in a torque generation. Therefore, in order to ensure that the output of the control signal is within the limits of the PWM, a zero-sequence component may be added to the calculated control signal.

In order to derive information regarding the rotor position or rotor angle in the salient-pole machine 200, the controller 100 may furthermore comprise a means for receiving 130 a current response of the phases of the salient-pole machine 200, i.e. a current response receiver 130 for receiving a current response of the phases. As the current response is dependent on the position of the rotor in the salient-pole machine, the current response may allow to derive a rotor position or a rotor angle, which is directly linked to its position. The rotor position or rotor angle therefore may be determined based on a current response to the test pulses with a pulse width determined in an adaptive manner. In a preferred embodiment, the synchronous machine comprises at least three phases and the controller comprises a current input for receiving a current response of the phases during the at least two consecutive test voltage vectors $V_1$, $V_2$ and being adapted for determining a rotor angle of the machine from these current responses. To measure this current response sampling of the current can be done before the switching moment of the transistor switches of the pulse generating unit, hence lowering measurement noises and increasing the accuracy of the position estimator.

The controller furthermore may comprise a processing means 140, i.e. a processor 140, for deriving an operational parameter, advantageously a motion state such as for example a rotor position or a rotor angle, rotor speed, flux position or speed of the flux vector of a salient-pole machine.

Figure 2:
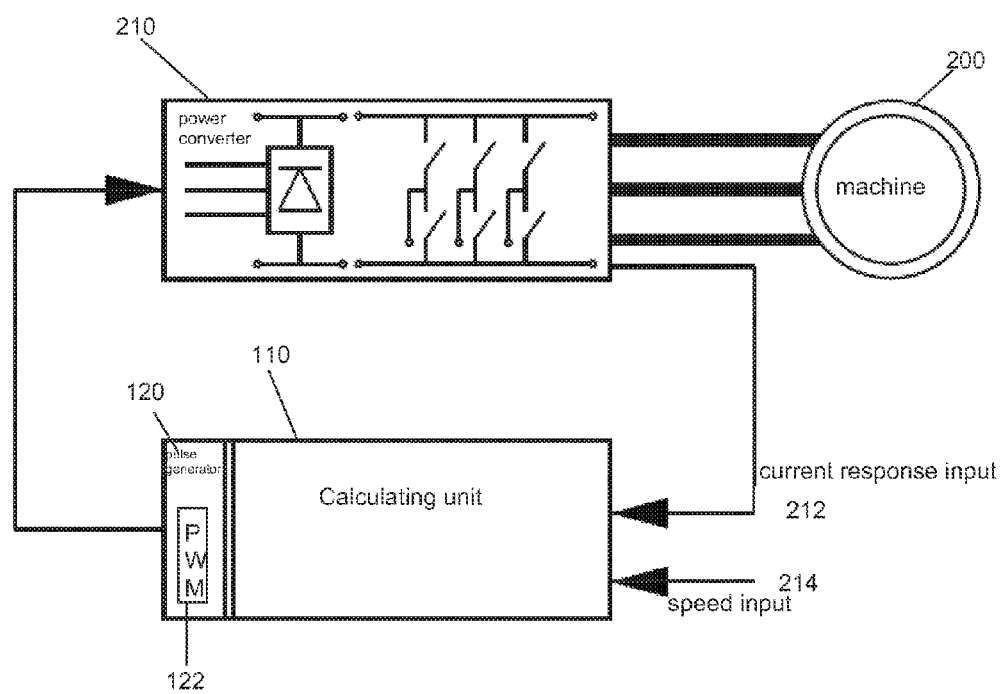
FIG. 2 shows a schematic diagram of an assembly of a controller according to an embodiment of the present invention and a salient-pole machine.

By way of illustration, a schematic representation of an example of an assembly of a system of a controller 100 and a salient-pole machine 200 is shown in FIG. 2, embodiments of the present invention not being limited thereto. A controller 100 is shown comprising a calculator 110. The controller 100 may perform the function of selecting the appropriate control strategy and/or performing the control. Selection of the control strategy thereby may depend on the position, speed or toque of the salient-pole machine 200. The controller furthermore advantageously performs the function of estimator of the rotor position, and to use this information to control the salient-pole machine. The input provided to the controller may be the current response input 212, e.g. the measured currents, measured at the phases of the salient-pole machine. Furthermore, the controller 100 may have as an input the desired torque or speed input 214, which may be information obtained via a user input. The controller may comprise a pulse generator 120 comprising a pulse width modulator for modulating the test voltage signals. The pulse generator 120 may comprise or may be in connection with a power converter 210 adapted for generating appropriate power signals.

Control of a salient-pole machine can be performed in an automated and/or automatic way. It may for example be performed in agreement with predetermined algorithms or based on neural network processing. For example, based on determined operational state of the salient-pole machine, e.g. derived from a rotor position or rotor angle, the controller may decide to increase the speed or torque of the salient-pole machine, to decrease the speed or torque of the salient-pole machine, to switch over to a safety procedure, for example stopping the operation of the salient-pole machine or operating the machine with the faulty phase in open circuit, etc. In some embodiments, control of the salient-pole machine may be performed in a self-regulating way, whereby increase of the speed or torque of the salient-pole machine is coupled to the amount of disturbance measured. Increasing the speed or torque may for example be performed once a given degree of stability, e.g. in view of a predetermined level of stability to be obtained, is reached. Control of the salient-pole machine may be performed upon request of a user, at regular time, continuously or nearly continuously, at predetermined moments in time, according to a programmed time schedule, etc.

In a second aspect, the present invention also relates to an assembly of a salient-pole machine, a pulse generator and a controller for controlling the salient-pole machine. The controller thereby is a controller according to any of or a combination of embodiments as described in the first aspect of the present invention. The pulse generator may be provided as a separate component or may be part of the controller. It may be separate from or integrated in the controller. The controller thereby may comprise the same features and/or advantages as described in the first aspect.

In a third aspect, the present invention also relates to a method for controlling a salient-pole machine. The method for controlling is based on generation of test pulse properties for test pulses to be supplied to the salient-pole machine and by using a current response of the salient-pole machine for evaluating an operational parameter of the salient-pole machine. More particularly, the method for controlling a salient-pole machine may comprise the steps of calculating test pulse properties for test pulses for supply to phase inputs of the salient-pole machine, the test pulse properties comprising a pulse width. Calculating the test pulse properties thereby comprises determining the pulse width in an adaptive manner. Such determination of the pulse width in a adaptive manner may be performed by determining the pulse width adaptively as function of a steady-state voltage $V_0$ of phases of the salient-pole machine. The method therefore furthermore may comprise determining a steady-state voltage of the phases of the salient pole. The latter may be obtained as estimation as the controller output is attached to the phases of the synchronous machine which can be regarded as an estimation of the steady-state voltage. The method furthermore may comprise, receiving a current response of the phases received as response to test pulses supplied to the phases of the salient-pole machine, whereby the test pulses have the test pulse properties as calculated. The method also may comprise deriving an operational parameter for the salient-pole machine based on the current response obtained. Other particular features and advantages of method embodiments according to the third aspect may be as described for the first aspect, whereby the method may comprise steps performing the functionality of the one or more components of the system embodiments described in the first aspect.

By way of illustration, the present invention not being limited thereto, some particular examples of systems and configurations of a salient-pole machine and a controller according to embodiments of the present invention will be discussed in more detail.

Figure 3:
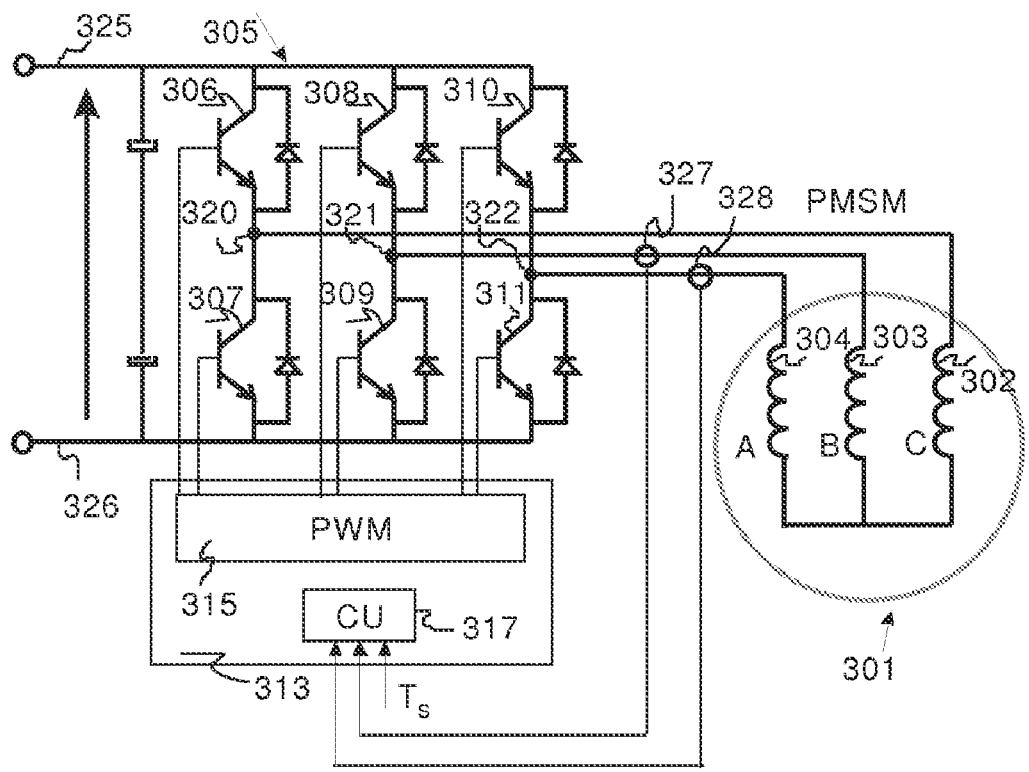
FIG. 3 shows a schematic diagram of a three-phase Permanent Magnet Synchronous Machine and controller according to the invention.

FIG. 3 shows a Permanent-Magnet Synchronous Motor (PMSM) 301 having three windings 302, 303, 304 connected in a star configuration. These phases are referred to as either u,v,w or a,b,c respectively, either in small or capital letters. Each winding of the motor 1 is powered by a drive circuit, or power converter 305, which is a three-phase rectifier bridge with three pairs of switches 306, 307; 308, 309 and 310, 311 which are, in the present example, formed by Insulated Gate Bipolar Transistors (IGBT). The switches 306-311 are driven by a controller 313 comprising a Pulse Width Modulator (PWM) 315 and a calculating unit 317 controlling the PWM 315. The PWM selectively couples the inputs 320, 321, 322 of the windings 302, 303, 304 either to the supply terminal 325 or to ground terminal 326 of the power converter 305. The duration of the switched states, and hence the voltage that is supplied to each winding 302, 303, 304 is determined by the modulated pulse widths of the pulses of the PWM 315. The PWM 315 is controlled by the calculating unit 317 in order to achieve the desired motor torque T or speed S, which can be input into the controller 313, and in order to estimate a rotor position of the PMSM 301. For stable control of the PMSM 301, it is necessary that the position of its rotor is known. In order to measure the rotor position without resorting to the use of mechanical sensors, test voltage pulses are supplied to winding inputs 320, 321, 322. Doing away with a mechanical position sensor reduces costs of the PMSM and increases reliability of the drive.

Current sensors 327 and 328 measure the current caused by a voltage test pulse. As the PMSM has saliencies, the inductance of the stator windings 302, 303, 304 changes as a periodic function of the rotor rotational position. Consequently, measuring the stator current via current sensors 327 and 328 and processing the stator current response to the test signals provides an estimation of the rotor position. Processing of the current response to obtain the estimated rotor positions requires measuring two current responses by the sensors 327 and 328 and a transformation of the reference frame, an addition and a single goniometrical function by the calculating unit 317.

In the following, different aspects will be further described with reference to FIG. 3, although the invention is not limited thereto and this has only been performed by way of illustration.

Figure 4A:
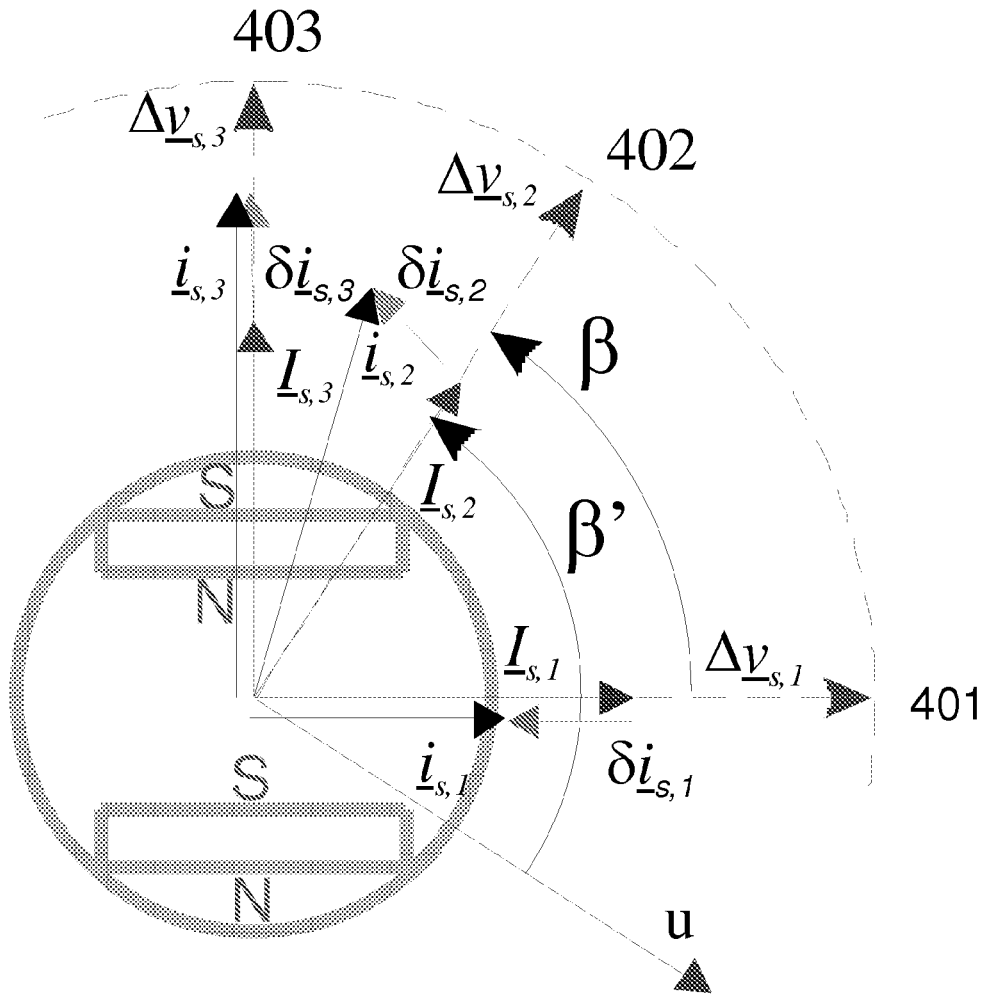
FIG. 4a and FIG. 4b illustrate different current responses to test voltage pulses, as can be used in embodiments of the present invention.
Figure 4B:
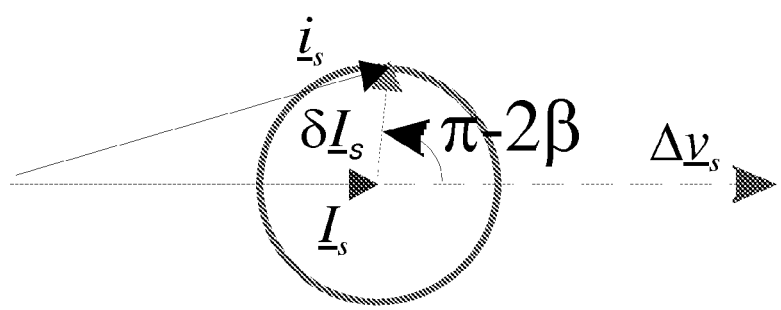

By way of illustration, the present invention not being limited thereto, different current vector variations after a test period during which a voltage step occurs are shown in FIG. 4a. The shown current vector variations, indicated for three different situations 401, 402, 403, differ solely in that the test voltage vector deviations from steady state used had a different direction with respect to the orthogonal magnetic axes. For both test voltage vector deviations which are aligned along one of the magnetic axes the current variation is in phase with the test voltage vector deviation. In FIG. 4b, the current variations are shown in a reference frame with the real axis along the corresponding voltage test vector. The current variations are given by $$i_s = I_s + \delta i_s$$

-continued with $$I_s = \frac{L}{L^2 - \Delta L^2}\Delta v_s \text{ and } \delta i_s = \frac{\Delta L}{L^2 - \Delta L^2}e^{-2j\beta}\Delta v_s$$

wherein $$L = \frac{L_q + L_d}{2} \text{ and } \Delta L = \frac{L_q - L_d}{2}$$

with $L_q$ and $L_d$ the quadrature and direct inductances. The angle of the voltage vector $\Delta v_s$ in a reference frame (qd) fixed to a rotor of the salient-pole machine is given by the angle $\beta$. It is noted that this angle is a function of the rotor position. The angle of the test voltage vector deviation to the reference u-phase $\beta'$ is known. By estimating $\beta$, the position of the q-axis is known by subtracting $\beta$ from $\beta'$. It is noted that only absolute angles are used and no incremental angles are used. It thus is an advantage of embodiments of the present invention that absolute position estimations can be provided, resulting in more appropriate estimates over time as this avoids incremental errors.

Figure 5:
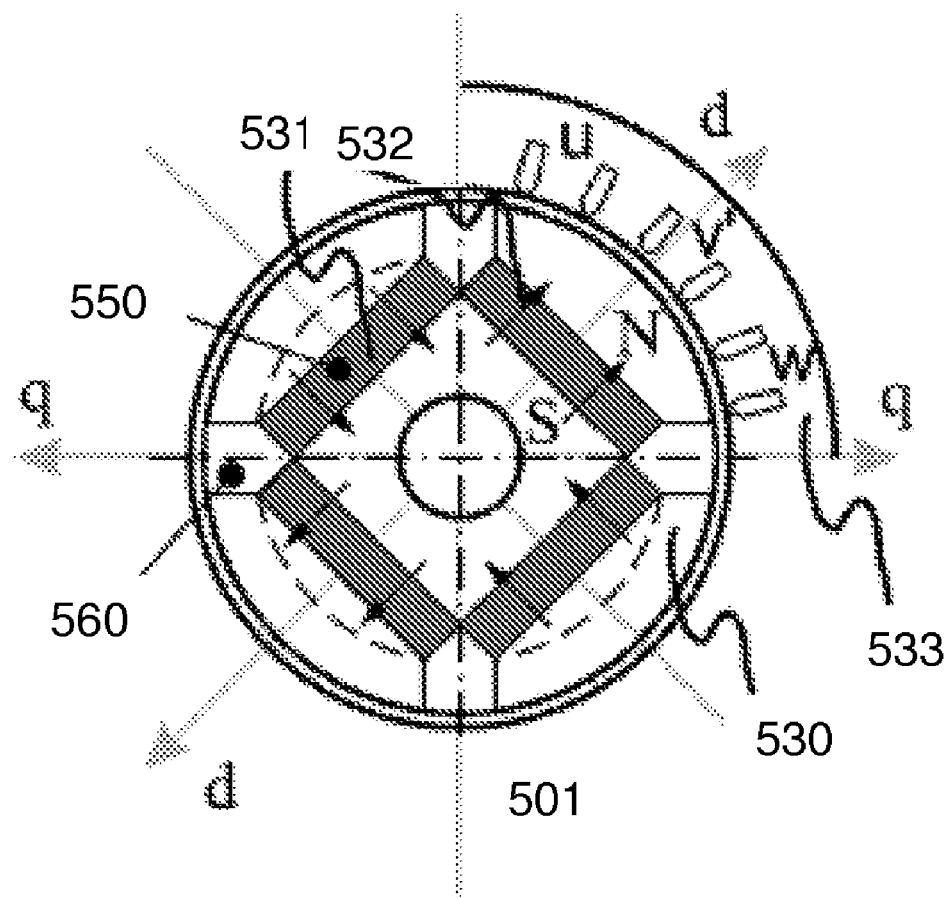
FIG. 5 shows a schematic diagram of an electric permanent magnet synchronous motor.

FIG. 5 shows a schematic drawing of a three-phase interior permanent-magnet synchronous motor (IPMSM) 501, having a rotor 530 with four projecting magnets 531, 532 forming four poles alternating between north and south. The stator comprises three distributed windings u, v, w, in the stator slots of which reasons of clarity only a pole pitch has been shown. The inductance of each phase u, v, w varies in view of reluctance variations along the air gap between the stator 533 and rotor 530 and has a minimum value along two direct axes d, that are in line with the permanent magnets 531, 532 indicating a magnetic region 550 and has a maximum value along two quadrature axes q, which are situated intermediate of the direct axes d, indicating an amagnetic region 560. Hence the stator current response on a step in the stator voltage, strongly depends on the rotor position.

Each winding 302, 303, 304 in FIG. 3 of the three phase-PMSM 301 can via switches 306-311 be either connected to the supply terminal 325, or to the ground terminal 326 of the power converter 305, resulting in 8 states of the phases A,B,C in FIG. 3. If the situation in which phase A is connected to the high voltage terminal, states B, C being connected to ground, is indicated as state 1:[1,0,0] there are 6 conducting states: state 2: [1,1,0] in which only C is low, state 3:[010] in which only B is high, state 4: [011] wherein only A is low, state 5: [001] only C is high and state 6: [101] only phase B being low. The states [111] and [000] are zero-volt states. States 1, 2, 3, 4, 5 and 6 can be indicated as +A,−C,+B,−A,+C and −B. By turning on and off the phases A, B, C once in a PWM-period, the relative lengths of time in each state determine the magnitude and direction of the magnetic field in each winding 302, 303, 304. This in return produces the total torque exerted on the rotor 330 of the PMSM 301. A modulation algorithm for calculating the pulse widths for obtaining a desired speed or torque is executed by the calculating unit 317 in FIG. 3.

In order to estimate the motion states of the PMSM 301, test pulses are frequently supplied to the windings 302, 303 and 304 and the current responses on these pulses are measured by the sensors 327 and 328. The test pulses may be supplied with a frequency of between 1 kHz and 20 kHz, e.g. between 5 kHz and 20 kHz, preferably synchronous with the carrier frequency of the pulse generator or sampling frequency of the controller. Furthermore, a discrete-time current control loop with a fixed sampling frequency is applied. An average of each phase current over a switching period is measured. By using a centered pulse-width modulator, the phase currents cross their average value over a switching period in the middle of each switching period. Therefore, sampling the currents on these instances allows to control the average current. The simultaneous operation of estimator and controller is achieved by adapting the test pulses to the steady-state voltage vector. In the adaptive method, the test pulse sequence is modified in order to have a zero voltage deviation from steady state at the aforementioned sample instances. In the present example, the modification of the test pulse sequence is as follows. A first test vector $V_1$ which results in a test voltage vector deviation $\Delta V_1$ from steady state is applied during half a switching period $T_1$. Following this first test vector, a test vector $V_2$ with a test voltage vector deviation from steady state $\Delta V_2 = -\Delta V_1$ is applied during a whole switching period $T_2$. Finally, a third test vector is applied during half a switching period $T_3$ which causes a voltage deviation from steady state $\Delta V_1$.

Figure 6:
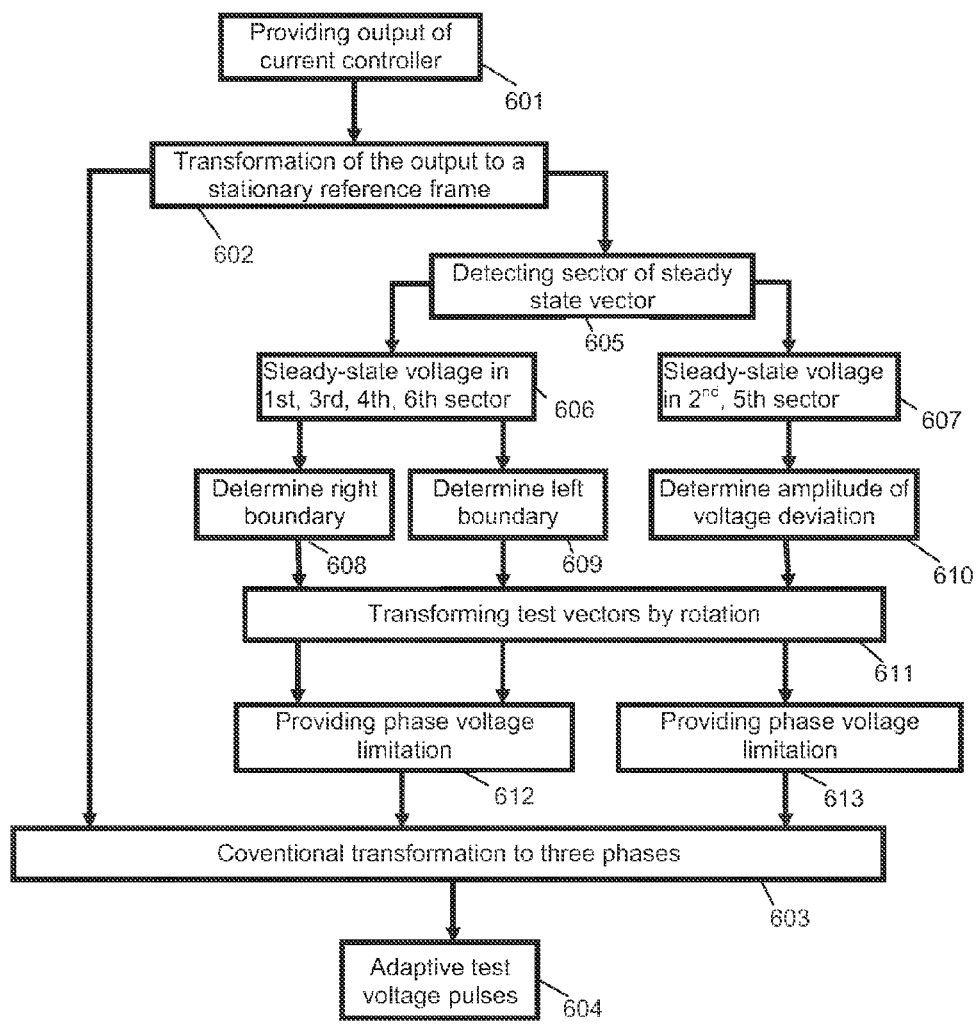
FIG. 6 shows a flowchart of the generation procedure of the adaptive test voltage pulses.

FIG. 6 shows a flow chart of the steps for calculating the steady state voltage pulses and the measurement voltage pulses on which the input to the pulse-width modulator 315 is based. The flowchart is given for a three-phase synchronous machine, but it is also possible to extend this method to machines with more than three phases.

The average current measurements are processed and transformed to a reference frame fixed to the rotor and compared to the desired value. The difference is then given to the PI current controller which output is given to a pulse-width modulator. This output is given in the reference frame fixed to the rotor. During normal operation, the output of the current controller, provided to the system in step 601, —which is part of the digital calculating unit 317 and which determines the desired pulse widths or duty ratio's of the PWM is transformed to a stationary reference frame, fixed to an observer at standstill in step 602. Only the current controller is active, no test pulses being generated. A conventional transformation to three phases, as indicated in step 603, may for example be performed by using an inverse Clarke transformation in step 3, as known in the art.

During a test period, the duty ratio's that are computed by the current controller are altered in order to obtain test vectors. In one implementation, the test vectors generate voltage vector deviations from steady state which are aligned along one of the machine phase directions. Such an alignment, however, is not necessary to obtain a position estimation. The test pulses that are computed are adapted to the steady-state voltage such as to result in minimum distortions of the steady-state phase currents without the use of a machine model.

Figure 7:
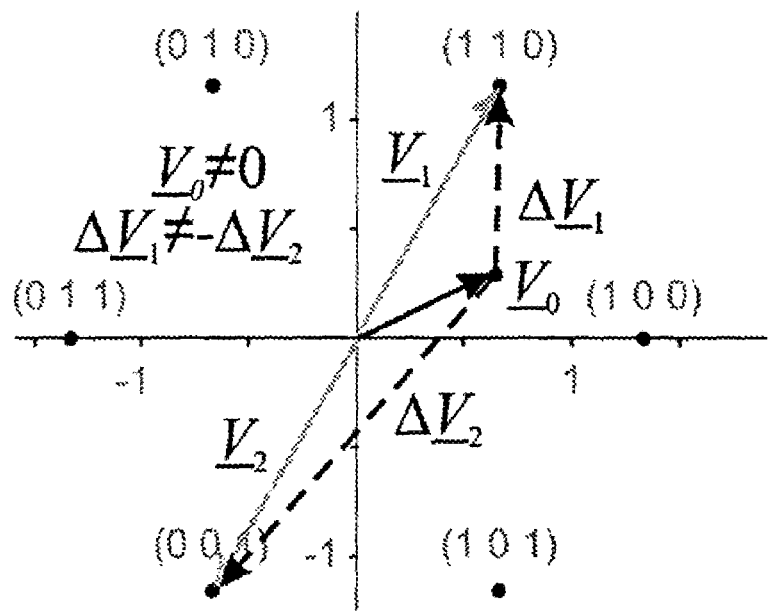
FIG. 7 shows a space vector diagram for a loaded machine with steady state voltage deviations with unequal direction and magnitude.

FIG. 7 shows a space vector diagram with two consecutive voltage test vectors $V_1$, $V_2$ of equal magnitude and opposite direction in the [110] and [001] states of the windings of the PMSM. In known position estimators, the current controller is halted during several switching periods and a sequence of test pulses is applied to the inputs 320, 321, 322 of the windings 302, 303, 304. In the known position estimator approach, each test pulse corresponds with one of the active space voltage vectors which is applied during a switching period.

By subtraction of the current variations caused by the two consecutive test pulses $V_1$, $V_2$, the influence of the back-emf and stator resistance is strongly reduced. By using this conventional sensorless strategy, the requirement for a machine model is avoided.

Nevertheless, as the machine 301 is loaded with a steady state voltage $V_0$, the test vectors $V_1$, $V_2$ along the [110] and [001] directions in the state vector diagram, result in a net voltage deviation from the steady state voltage $V_0$ since the voltage deviation vectors $\Delta V_1$, $\Delta V_2$ do not add up to zero. Hence the test sequence shown in FIG. 7 will lead to an undesired distortion of the steady-state current.

Figure 8:
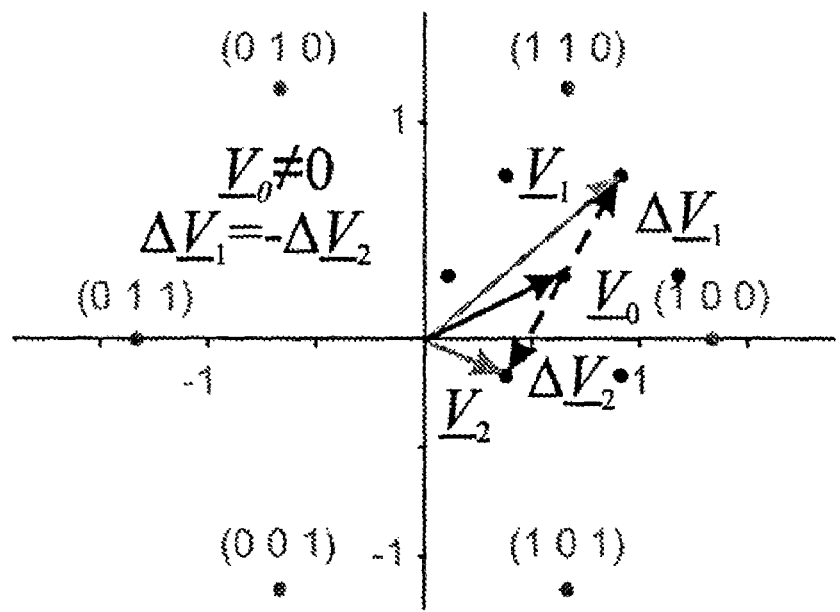
FIG. 8 shows a space vector diagram for a loaded machine with adaptive voltage test vectors and voltage deviations that add up to zero.

As is shown in FIG. 8 and in accordance with the invention, the consecutive voltage test pulses $V_1$, $V_2$ are no longer arranged along the machine state directions [110] and [001] but are so arranged in the space vector diagram in relation to the steady-state voltage $V_0$ that the consecutive voltage deviations $\Delta V_1$, $\Delta V_2$ add up to zero. Forming the adaptive test vectors $V_1$, $V_2$ which differ from the steady-state voltage by a deviation for which applies: $\Delta V_1 = -\Delta V_2$, is carried out in steps 605 to 613 of the flow chart of FIG. 6.

During a test period, the duty ratio's of the pulses that are computed by the calculating unit 317 are altered in order to obtain test vectors. In the example that is described below, the voltage deviations are aligned along the directions of the different phases. It should be noted that this alignment is not a necessary requirement for obtaining a position estimation.

Figure 9:
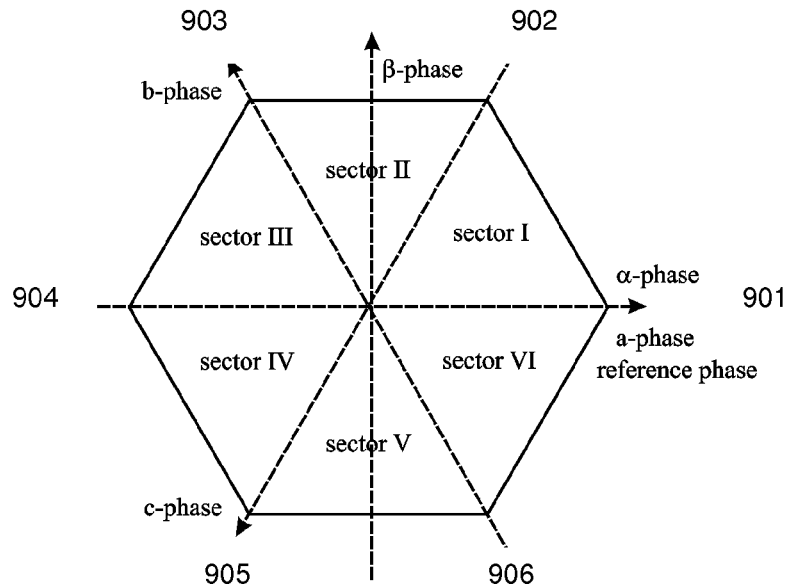
FIG. 9 shows a motor phase diagram in a stationary ($\alpha\beta$)-reference frame.

During a first test period, test pulses are generated that result in voltage vector deviations along the reference phase which in this case is the a-phase (states 901 and 904 in FIG. 9). Thereafter, two succeeding test periods are applied during which voltage vector deviations are generated that differ from the previous one by 120 degrees; b-phase (states 903 and 906 in FIG. 9) and c-phase (states 905 and 902 in FIG. 9). Each voltage deviation caused by a test pulse will thus be aligned with one of the phases.

In the following, test pulses that result in voltage vector deviations along the reference a-phase are calculated first. In these cases, a stationary reference frame $(\alpha\beta)$ is defined for which the $\alpha$-axis is aligned with the reference a-phase.

Depending on the direction of the steady state voltage $V_0$, two cases are distinguished to compute the test pulses along the reference phase. In the first case, the steady-state voltage vector $V_0$ is within the first (sector I), third (sector III), fourth (sector IV) or sixth (sector VI) sector of sixty degrees, as shown in FIG. 9. In the second case the steady state voltage vector $v_0$ is within the second (sector II) or fifth sector (sector V) of the space vector diagram of FIG. 9. A detection step is carried at step 605 in the flow chart of FIG. 6 in order to determine in which sector the steady state vector $v_0$ is located. Step 606 is followed when the steady-state voltage is within the first, third, fourth or sixth sector, whereas step 607 is followed when the steady state voltage is within the second or fifth sector.

Figure 10:
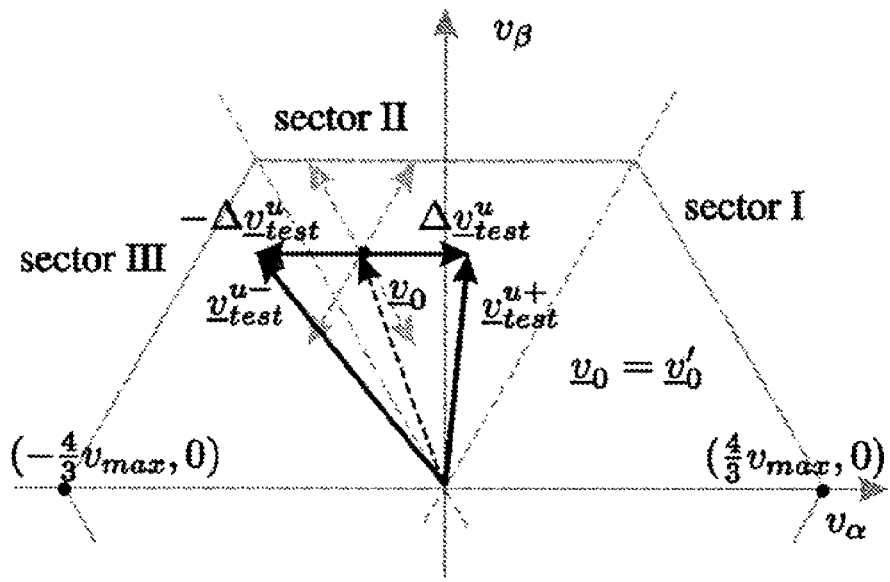
FIG. 10 shows the test voltage pulse in the first sector of the diagram of FIG. 7 to be limited to a left or right hexagonal boundary.
Figure 11:
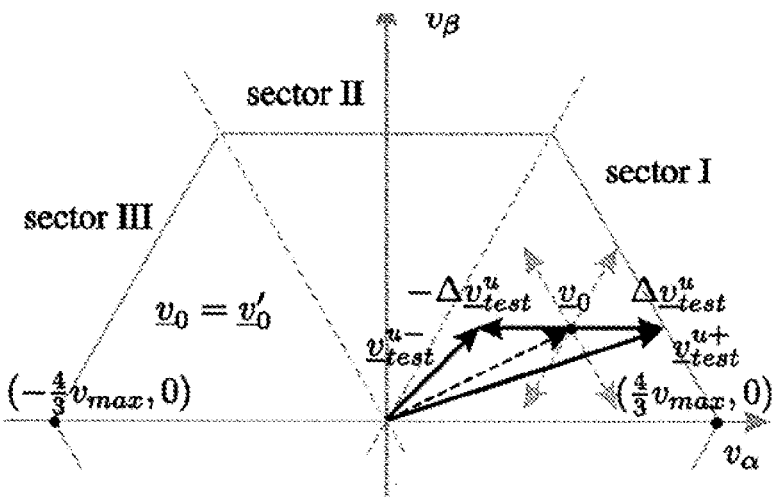
FIG. 11 shows the amplitude of voltage deviation $\Delta v''_{test}$ to be given by the distance between the upper or lower hexagonal boundary and the steady state vector measured along the direction of the b-phase or c-phase.

For the first case (sectors I, III, IV and VI in FIG. 9), one of the test voltage vectors $v^{u+}_{test}$, $v^{u-}_{test}$, which results in a steady-state voltage deviation in the direction of the reference phase u, is located on the hexagonal boundary. This is shown in FIG. 10.

The test pulses thereby may be given as follows:

$$\underline{v}^{u+}_{test} = \min\left(\frac{4}{3}v_{max}, \frac{4}{3}v_{max} + 2v_{\alpha,0}\right) - \frac{1}{\sqrt{3}}|v_{\beta,0}| + jv_{\beta,0}$$

$$\underline{v}^{u-}_{test} = \max\left(-\frac{4}{3}v_{max}, -\frac{4}{3}v_{max} + 2v_{\alpha,0}\right) + \frac{1}{\sqrt{3}}|v_{\beta,0}| + jv_{\beta,0}$$

Figure 12:
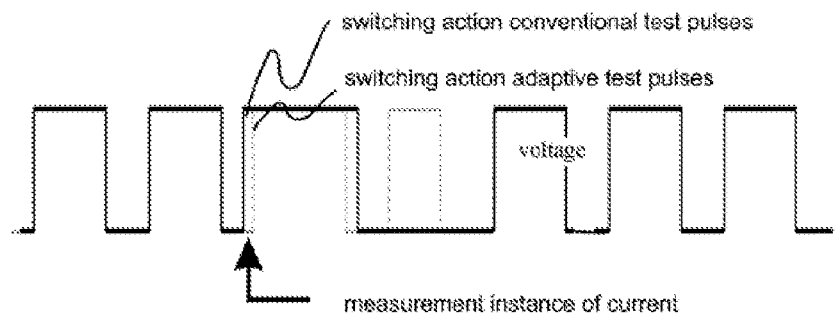
FIG. 12 illustrates the different switching actions for the test pulses as can be used in embodiments according to the present invention.

Herein $v_{\alpha,0}$ and $v_{\beta,0}$ are the components of the steady-state voltage $V_0$ in the $(\alpha\beta)$-frame. $v_{max}$ thereby is a parameter that defines the hexagonal boundaries which are shown in the figures. This parameter can be lowered for the purpose of reducing the current ripple during the test periods. This will reduce the torque distortions during the test periods also. Reducing $v_{max}$ reduces the maximum duty ratio. This means that before the first switching action in a switching period a zero-sequence vector is applied. It is known that during this short period the current remains constant as the phase voltages are the same. As a result of reducing the maximum duty ratio, each phase current can be measured before the switching action of the power switches, as indicated in FIG. 12. Therefore, a reduction in the measurement noise is obtained. It is also important to note that the maximum output of the current controller may not exceed $v\_{max}$ or in other words that the average voltage vector $V_0$ has to be within the hexagonal boundaries defined by $v_{max}$. It may be an implementation to have a second limitation $v_{controller\_max}$ smaller or equal than $v_{max}$ in order to ensure a certain amplitude for the voltage deviation during the test periods.

Once $v^{u+}_{test}$ is determined in steps 608 (determination of right boundary) and 609 (determination of left boundary) of the flowchart of FIG. 6, the other voltage test vector $v^{u-}_{test}$ can be computed by mirroring the test vector on the hexagonal boundary, $v^{u+}_{test}$, around the $\beta$-axis and by adding twice the $\alpha$-component $(2v_{\alpha,0})$ of the steady state voltage $V_0$ to it.

For the second case (sectors II and V in FIG. 9), the test voltage vectors $v^{u+}_{test}$, $v^{u-}_{test}$ which results in a steady-state voltage deviation $\Delta v^u_{test}$ in the direction of the reference phase, is a function of the $\beta$-component $v_{\beta,0}$ of the steady state voltage $V_0$ only. In step 610 of the flowchart shown in FIG. 6, the amplitude of voltage deviation $\Delta v^u_{test}$ is given by the distance between the upper or lower hexagonal boundary and the steady-state vector measured along the direction of the b-phase or c-phase (see FIG. 9). Test vectors the may be given by $$\Delta \underline{v}^u_{test} = \frac{4}{3}v_{max} - 2/\sqrt{3}\,|v_{\beta,0}|$$

and $$\underline{v}^{u+}_{test} = \underline{v}_0 + \Delta \underline{v}^u_{test} \text{ and } \underline{v}^{u-}_{test} = \underline{v}_0 - \Delta \underline{v}^u_{test}$$

Other test pulses causing a voltage deviation along the b-phase or c-phase can be rapidly computed by defining a new stationary $(\alpha'\beta')$-reference frame in step 602 of the flowchart for which the $\alpha'$-axis is aligned with the b-phase or c-phase respectively. The test vectors in these cases are obtained by the steps 605 to 610 of the flow chart as defined above in the new reference frame. The resulting test vectors are then transformed by rotation of the $(\alpha'\beta')$-reference frame to the $(\alpha\beta)$-reference frame in step 611 of the flow chart, resulting in the voltage test vectors being represented in the stationary reference frame.

In step 603 of the flowchart, the duty ratio's of the pulses for each of the three phases a,b,c are calculated using a conventional transformation such as for example an inverse Clarke transformation. From this the modulator 315 generates pulses with the desired pulse widths.

In order to ensure that the output of the transformation of step 603 is within the limits of the modulator 315, a zero-sequence component is added to duty ratio's calculated in steps 612 and 613 of the flow chart of FIG. 6. Step 612 indicates a step of providing phase voltage limitation in case step 606 was followed, whereas step 613 indicates a step of providing phase voltage limitation in case step 607 was followed. As the two components of the voltage vector are transformed to three-phase voltages, one degree of freedom exist in the solution. The zero-sequence voltage component or the average component of the three-phase voltage that may be freely chosen as it is a component that does not result in a torque generation. This zero-sequence component depends on the sector in which the steady-state voltage vector is located as well as on the sign of the voltage deviation.

For the first case (sectors I, III, IV and VI in FIG. 9) the zero-sequence component, $v^+_{cm}$, $v^-_{cm}$, of the stator voltage in the positive and negative direction of the phase respectively, in step 612 of the flow chart of FIG. 6 is given by:

$$v^+_{cm} = -\left(\frac{1}{\sqrt{3}} - \sqrt{3}\right)|v_{\beta,0}|$$

$$v^-_{cm} = \left(\frac{1}{\sqrt{3}} - \sqrt{3}\right)|v_{\beta,0}|$$

For the second case (sectors II and V in FIG. 9) the zero-sequence component, $v^+_{cm}$, $v^-_{cm}$, of the stator voltage in the positive and negative direction of the phase respectively, in step 613 of the flow chart of FIG. 6 is given by:

$$v^+_{cm} = -\left(\frac{2}{\sqrt{3}} - \sqrt{3}\right)|v_{\beta,0}| + v_{\alpha,0}$$

$$v^+_{cm} = \left(\frac{2}{\sqrt{3}} - \sqrt{3}\right)|v_{\beta,0}| + v_{\alpha,0}$$

Figure 13:
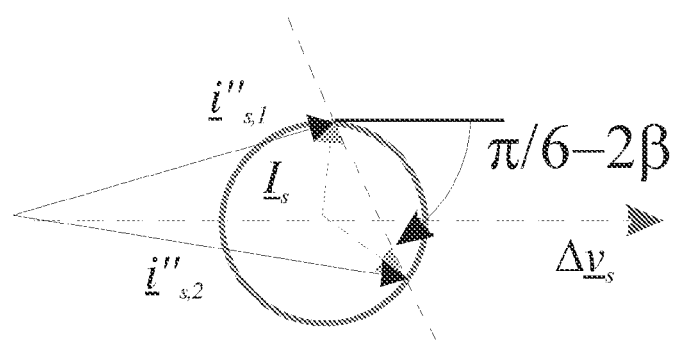
FIG. 13 illustrates the use of a difference in two current responses for determining an operational parameter, as can be used according to embodiments of the present invention.

In another aspect, the present invention relates to a method and system for controlling a salient-pole machine, whereby the control system is adapted for deriving an operational parameter based on a difference in two current responses as reply to test signals applied. The system and method may be used with any method for controlling a salient-pole machine wherein different current responses are used for determining an operational parameter of the machine, i.e. both with more conventional methods as with methods as described in the above aspects. The operational parameter may for example describe a motion state. It may for example be a rotor position or a rotor angle, rotor speed, flux position or speed of the flux vector of a salient-pole machine. The test signals may have a phase displacement with respect to each other. The test signals may be applied in a different direction. The two current responses may be in reply to test signals applied during different test periods. The two current responses may be in reply to test signals applied during subsequent test periods. By using the difference in two current responses, additional steps of vectorising the responses and determining a center for the different vectors may be avoided. This is shown in FIG. 13 where the direction of the difference between two current vectors is given as a function of β. During a first test, in reply to test voltage signal(s), a current response $i''_{s,1}$ is measured and transformed to a reference frame with the real axis along the corresponding test voltage vector deviation $\Delta v''_1$. In a second test, a test voltage vector deviation $\Delta v''_2$ is generated that has a phase displacement with respect to $\Delta v''_1$. The current response, again in reply to test voltage signal(s), $i''_{s,2}$ on this deviation is measured and transformed to a reference frame with the real axis along the corresponding test voltage vector deviation $\Delta v_2$. The angle β can be estimated by making the difference $i''_{s,2} - i''_{s,1}$ and by computing the angle of this vector difference as is shown in FIG. 13, wherein for this example the phase displacement has been chosen to be 120 degrees. The present aspect also relates to an assembly of a salient-pole machine and such a controller and to computer program products for performing control based on determination of the operational parameter using a difference in current responses.

In still another aspect, the present invention relates to a method and system for controlling a salient-pole machine, wherein the control system is adapted for compensating for non-linearity effects in the position. Such non-linearity effects may occur for example due to the magnetic interaction between the orthogonal magnetic axes. The induced error due to cross-saturation may be calculated and used for correction. In other words, in embodiments of the present invention, an estimate of the error made is obtained and the estimated error is used to compensate the operational parameter determined for controlling the salient-pole machine In one embodiment, determination of the induced error may for example be performed using a model allowing to compute the estimation error due to cross-saturation from the angle of the equivalent magnetizing current. The model may be based on simulating the drive with an estimator that uses a high frequency voltage pulse train. The drive may for example be modelled by $$\Delta i_m^{qd}(t) = r \Delta \phi_m^{qd}(t)$$

written in a reference frame (qd) fixed to the physical quadrature and direct axis and with $i_m$ the magnetizing current, $\Delta$ denoting the small variation of a vector, $\Delta \phi_m$ being the flux variation in the main flux generated by the high-frequency voltage and r being the reluctance. A more detailed description of such a model is described in "A general description of high-frequency position estimators for interior permanent-magnet synchronous motors" by De Belie et al. presented at the "International electrical machines and drive conference" 2005, paper 390.

The estimation error may be decreased using an iterative process. For example, from the initial rotor estimation, the components of the stator current in a reference frame fixed to the rotor may be calculated. These components may be computed by a rotation over the rotor angle. From this result, an equivalent magnetizing current can be calculated and an estimation error may be obtained. The initial position estimation may be corrected with this error and new current components in a reference frame fixed to the rotor can be obtained.

The correction process may be done once, may be repeated a fixed number of times, may be repeated until the estimation error is smaller than an user-defined threshold, etc. The estimation error depends on the components of the current in a reference frame fixed to the rotor. This means that if these components aren't altered than the estimation error isn't changed as well. In other words, as in most cases the load remains the same, the estimation error has to be calculated only once.

In other embodiments according to the present aspect, compensation of non-linearity effects may be performed by compensating for the estimation error using a look-up table or a user-defined function to compute the estimation error. In one particular example, computation of the estimation error due to cross-saturation may be performed using a function that is dependent on the saliency ratio and on the current through the magnet, i.e. the steady-state current components of the machine reflecting the changing amount of saturation.

Figure 14:
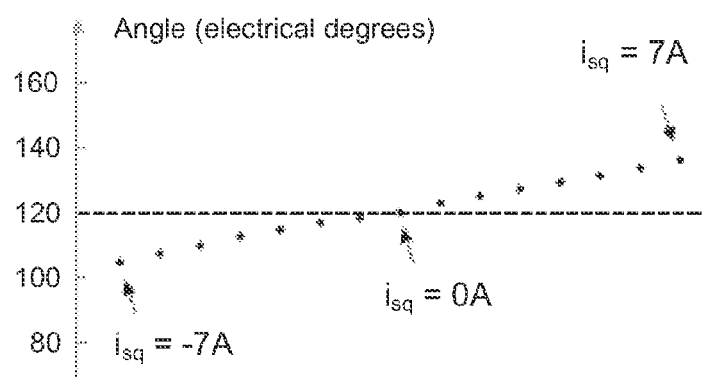
FIG. 14 illustrates an estimated error being proportional with the quadrature current, as can be used in embodiments according to the present invention.

Such a function describing the estimation error may for example be given by a term proportional to the quadrature current, as illustrated in FIG. 14, and a term proportional to the product of both the quadrature and the direct current component, i.e.

$$\theta_\epsilon = K_1 i_{sq} + K_2 i_{sq} i_{sd}$$

with $\theta_\epsilon$ being the estimation error, $K_1$ and $K_2$ being proportionality factors, $i_{sq}$ being the quadrature current and $i_{sd}$ being the direct current. FIG. 14 shows an example of a graph indicating the estimation error angle, expressed in electrical degrees, as function of the quadratic current $i_{sq}$ for a particular example. The quadrature current and the direct current thereby can be estimated by transforming the measured phase currents to the estimated reference frame fixed to the rotor whereas the proportionality factors may be determined experimentally, based on a model or based on a mathematical relationship. In one example, the proportionality factors may be obtained at standstill by comparing the estimated rotor angle with the measured angle obtained with an encoder.

Embodiments according to the present invention allow a more accurate estimation of a motion state, such as for example a rotor position or rotor angle, resulting in a better control of the salient-pole machine.

Embodiments according to the present invention can for example be combined with embodiments described in other aspects of the present invention.

Figure 15:
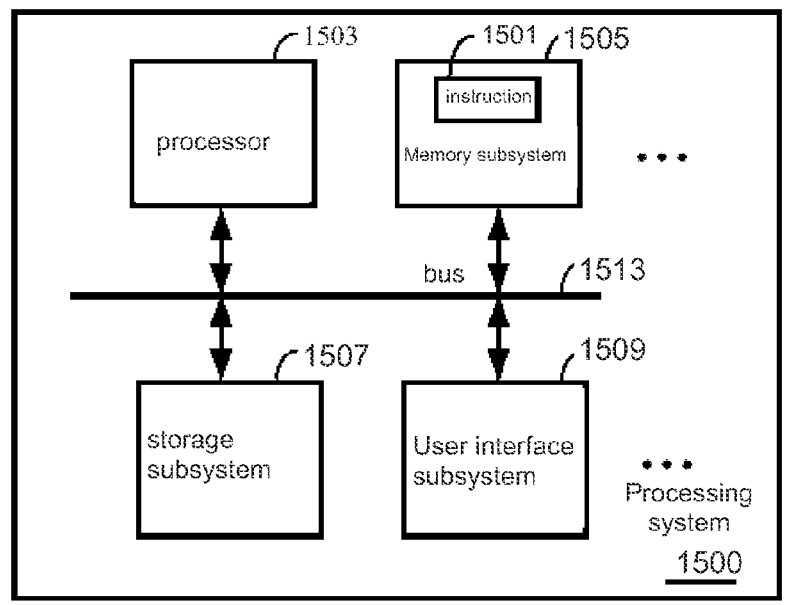
FIG. 15 shows a computing means as can be used for performing methods of controlling a salient-pole machine according to embodiments of the present invention.

The above described method embodiments for controlling a salient-pole machine may be at least partly implemented in a processing system 1500 such as shown in FIG. 15. FIG. 15 shows one configuration of processing system 1500 that includes at least one programmable processor 1503 coupled to a memory subsystem 1505 that includes at least one form of memory, e.g., RAM, ROM, and so forth. It is to be noted that the processor 1503 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. For example, the determination of test pulse properties may be a computer implemented step. The processing system may include a storage subsystem 1507 that has at least one disk drive and/or CD-ROM drive and/or DVD drive. In some implementations, a display system, a keyboard, and a pointing device may be included as part of a user interface subsystem 1509 to provide for a user to manually input information. Ports for inputting and outputting data also may be included. More elements such as network connections, interfaces to various devices, and so forth, may be included, but are not illustrated in FIG. 15. The memory of the memory subsystem 1505 may at some time hold part or all (in either case shown as 1501) of a set of instructions that when executed on the processing system 1500 implement the steps of the method embodiments described herein. A bus 1513 may be provided for connecting the components. Thus, while a processing system 1500 such as shown in FIG. 15 is prior art, a system that includes the instructions to implement aspects of the methods for controlling a salient-pole machine is not prior art, and therefore FIG. 15 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non-volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

It is to be understood that although preferred embodiments, specific constructions and configurations, as well as materials, have been discussed herein for devices according to the present invention, various changes or modifications in form and detail may be made without departing from the scope and spirit of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A controller for controlling a salient-pole machine, the controller being adapted for determining a steady-state voltage $V_0$ of phases of the salient-pole machine and comprising
    a calculating unit for calculating test pulse properties for test pulses for supply to phase inputs of the salient-pole machine, the test pulse properties comprising a pulse width, wherein the calculating unit is adapted for determining the pulse width in an adaptive manner,
    a current response receiving means for receiving a current response in reply to the test voltage pulses supplied to the phases of the salient-pole machine and a processing means for deriving an operational parameter of the salient-pole machine based on the current response,
    wherein the calculating unit is adapted for calculating test voltage vectors $V_1$, $V_2$ for consecutive test pulses, each test voltage vector deviating from the steady-state voltage $V_0$ by a respective voltage deviation $\Delta V_1$, $\Delta V_2$, wherein the test voltage vectors $V_1$, $V_2$ are determined in such a manner that $\Delta V_1$ is at least substantially equal to $-\Delta V_2$, the controller not requiring an estimation of the induced voltage.

2. A controller according to claim 1, wherein the controller is adapted for determining the pulse width adaptively as function of the steady state voltage $V_O$.

3. A controller according to claim 1, wherein the calculating unit is adapted for determining the pulse width of said test pulses based on said calculated test voltage vectors $V_1$, $V_2$.

4. A controller according to claim 1, wherein the calculating unit is adapted for calculating test pulses properties taking into account power supply limitations.

5. A controller according to claim 1, wherein the controller furthermore is adapted for generating a control signal comprising information regarding the test pulses for supply to a pulse generator that is connected with an output to phase inputs of the machine for supplying test pulses to phases of the machine.

6. A controller according to claim 5, wherein the controller is adapted for adding a zero-sequence component to the calculated control signal.

7. A controller according to claim 1, wherein the steady-state voltage vector $V_0$ in a test phase is transformed to a stationary reference frame ($\alpha\beta$) and wherein for a first set of sectors (I, III, IV, VI) in the frame ($\alpha\beta$) a test voltage vector $v^{u+}_{test}$ is situated on a transverse hexagonal boundary, and for a second set of sectors (II,V) a voltage deviation $\Delta v^u_{test}$ has an amplitude that is determined by a distance of the voltage vector $V_0$ from an upper or lower horizontal hexagonal boundary.

8. A controller according to claim 1, wherein the controller is adapted for generating a control signal to a pulse generator comprising a pulse width modulator for controlling the generating of test pulses having a modulated pulse width.

9. A controller according to claim 1, wherein the controller includes switches arranged to switch the phases between a higher and a lower voltage level, wherein the current responses are received at the current response receiving means after operation of the switches.

10. A controller according to claim 1, wherein the operational parameter of the salient-pole machine describes a motion state of the salient-pole machine.

11. A controller according to claim 10, wherein the motion state of the salient-pole machine is expressed in absolute terms with reference to a reference system fixed to the phases of the salient-pole machine.

12. A controller according to claim 1, wherein the controller is adapted for compensating non-linearity effects in a position estimation of a rotor by using a function that is dependent on a saliency ratio and steady-state current components of the machine.

13. A controller according to claim 1, wherein the controller furthermore is adapted for adjusting the control of the salient-pole machine based on the determined operational parameter.

14. A controller according to claim 1, wherein the controller is adapted for deriving an operational parameter based on a difference between two current responses of phases of the salient-pole machine as a result of at least two consecutive test signals having a phase displacement with respect to each other, the controller not requiring a machine model.

15. A controller according to claim 1, the controller being adapted during operation of the salient-pole machine to perform both the function of estimating a motion state and controlling the salient-pole machine at the same time.

16. A controller according to claim 15, whereby the test pulses are applied to derive the operational parameter with reduced steady-state current distortion.

17. A controller according to claim 1, the controller being adapted for controlling a permanent-magnet synchronous machine.

18. A method for controlling a salient-pole machine, the method comprising determining a steady-state voltage $V_0$ of phases of the salient-pole machine, calculating test pulse properties for test pulses for supply to phase inputs of the salient-pole machine, the test pulse properties comprising a pulse width, wherein calculating test pulse properties comprises determining the pulse width in an adaptive manner, receiving a current response in reply to the test voltage pulses supplied to the phases of the salient-pole machine and processing the current response for deriving an operational parameter of the salient-pole machine based on the current response, wherein said calculating comprises calculating test voltage vectors $V_1, V_2$ for consecutive test pulses, each test voltage vector deviating from the steady-state voltage $V_0$ by a respective voltage deviation $\Delta V_1, \Delta V_2$, wherein the test voltage vectors $V_1, V_2$ are determined in such a manner that $\Delta V_1$ is at least substantially equal to $-\Delta V_2$, said controlling not requiring an estimation of the induced voltage.

19. A method according to claim 18, wherein the method comprises determining the pulse width adaptively as function of a steady-state voltage $V_0$ of phases of the salient pole machine.

* * * * *